United States Patent
Wagner et al.

(10) Patent No.: US 7,573,830 B2
(45) Date of Patent: Aug. 11, 2009

(54) INTEGRATED PROGRAMMABLE DEVICE FOR SAFETY CRITICAL APPLICATIONS

(75) Inventors: Ralf Wagner, Landshut (DE); Bernhard Fuessl, Moosburg/Aich (DE); Arthur Kreutzer, Mauern (DE)

(73) Assignee: Texas Instruments Incorporated, Dallas, TX (US)

( * ) Notice: Subject to any disclaimer, the term of this patent is extended or adjusted under 35 U.S.C. 154(b) by 872 days.

(21) Appl. No.: 11/228,882

(22) Filed: Sep. 16, 2005

(65) Prior Publication Data

US 2006/0109841 A1     May 25, 2006

(30) Foreign Application Priority Data

Sep. 21, 2004    (DE)  ........................ 10 2004 045 756

(51) Int. Cl.
    *H04L 12/26*     (2006.01)
    *H04L 12/40*     (2006.01)

(52) U.S. Cl. ....................... 370/251; 370/438

(58) Field of Classification Search ......... 370/242–251, 370/438, 439, 462
See application file for complete search history.

(56) References Cited

U.S. PATENT DOCUMENTS

| | | | | |
|---|---|---|---|---|
| 4,376,999 A | * | 3/1983 | Abbott et al. ............... 370/217 |
| 4,761,747 A | * | 8/1988 | Gauder ........................ 340/2.4 |
| 2003/0138117 A1 | * | 7/2003 | Goff ............................ 381/103 |
| 2005/0140532 A1 | * | 6/2005 | Rubin et al. ................ 341/141 |

* cited by examiner

Primary Examiner—Hong Cho
(74) Attorney, Agent, or Firm—Mirna G. Abyad; Wade J. Brady, III; Frederick J. Telecky, Jr.

(57) ABSTRACT

An integrated programmable device has a plurality of signal inputs (P1, P2, P3) connected to respective ones of a plurality of switching elements (S1, S2, S3). Each switching element (S1, S2, S3) has an associated enable line (E1, E2, E3). A control circuit (15) activates one or more selected signal inputs (P1-P3) in accordance with a channel select signal (16) via these enable lines (E1, E2, E3). Feedback lines (F1, F2, F3) are connected to corresponding enable lines (E1, E2, E3) to a channel feedback indicative of which signal inputs (P1, P2, P3) is enabled. This allows determination whether the enabled signal inputs (P1, P2, P3) correspond to the channel select signal (16) and initiates an exception handling in case of a mismatch. The comparison can be performed by a compare logic circuit (40) or the channel feedback can be stored in a memory (30) accessible by a software program (60), which performs the comparison.

8 Claims, 1 Drawing Sheet

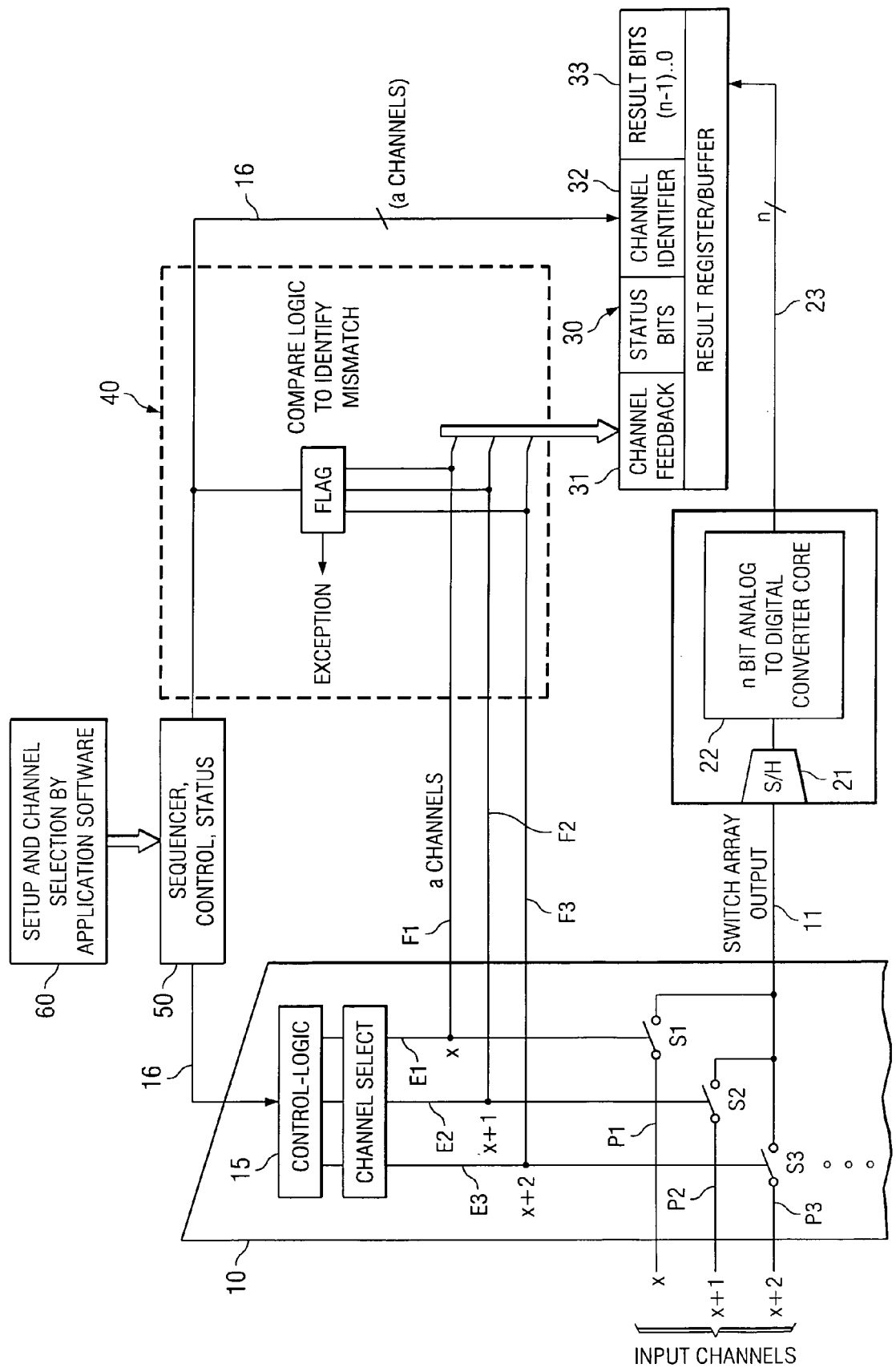

INTEGRATED PROGRAMMABLE DEVICE FOR SAFETY CRITICAL APPLICATIONS

TECHNICAL FIELD OF THE INVENTION the technical field of this invention is an intergrated programmable device for safety critical applications and a method for controlling the operation of such an intergrated programmable device.

BACKGROUND OF THE INVENTION

In automotive applications, more and more functions are implemented by programmable devices and associated application software rather than by dedicated circuitry. This is true for safety critical applications such as Electronic Stability Program (ESP) or airbag control and release. Proper operation is absolutely mandatory for such safety critical functions. Thus the programmable device and its associated application software must always operate properly.

Programmable devices are naturally used in common for several different applications. Switch arrays or multiplexers are used to selectively feed different input signals to the programmable device for the corresponding applications. It is mandatory for safety critical applications to ensure that the right input signals are selected by the switch array or multiplexer and fed to the programmable device. Malfunctions of the related switch control logic would result in passing other than the specified input signals through the switch array.

Hardware and software designers are today faced with the problem of how to verify that the output of the switch array or multiplexer actually corresponds to the selected input channel. To date, only plausibility checks of the selected signal(s) can determine whether the specified is proper. Plausibility checks are clearly unsatisfactory for security critical applications.

It is therefore an object of the present invention to provide an integrated programmable device which allows verification in a reliable way the correct operation of the input channel selection process.

SUMMARY OF THE INVENTION

These and other objects that appear below are achieved by an integrated programmable device having a plurality of signal inputs respectively connected to a plurality of switching elements. Each switching element has an associated enable line. A control circuit activates selected signal inputs via these enable lines in accordance with a channel select signal. Each enable line has an associated feedback line providing channel feedback indicating which signal inputs have been enabled. As long as the channel feedback matches the channel select signal, the operation of the control circuit is correct. Otherwise, exception handling is initiated.

The comparison between the channel select signal and the channel feedback can be performed by a compare logic circuit. Alternatively the channel feedback can be stored in a dedicated register or memory area accessible by software which performs the comparison.

The invention provides considerable safety improvement for programmable devices that have selectively connected analog inputs. This invention can be easily integrated in existing systems, does not require any external signals, components or massive software overhead.

BRIEF DESCRIPTION OF THE DRAWINGS

These and other aspects of this invention are illustrated in the drawings, in which:

FIG. 1 shows a block diagram of a switch array and embedded compare logic for a microcontroller.

DETAILED DESCRIPTION OF PREFERRED EMBODIMENTS

The circuit shown in FIG. 1 has three analog signal inputs P1, P2 and P3. Each signal input is connected to an input terminal of a corresponding one of three switching elements S1, S2, and S3 of switch array 10. Each switching element S1 to S3 has an associated enable line E1, E2 and E3, which is connected to a logic control circuit 15 of the switch array 10. An input of control circuit 15 is connected via an n-bit parallel line 16 to control and status sequencer 50. Control and status sequenced 50 is controlled by application software 60. The three switch elements S1 to S3 have corresponding output terminals connected to output 11 of switch array 10. Output 11 is connected to an input of sample and hold circuit 21. The output of sample and hold circuit 21 feeds analog to digital (A/D) converter 22. An n-bit parallel line 23 leads from the digital output of A/D converter 22 to result bits memory area 33 of result register 30.

Each of enable lines E1 to E3 is connected an associated feedback line F1 to F3. Feedback lines F1 to F3 lead to compare logic circuit 40. Compare logic circuit 40 is also connected to line 16 from control and status sequencer 50. Compare logic circuit 40 outputs the signal pattern from feedback lines F1 to F3 into a dedicated memory area 31 of control register 30. In addition, a channel select signal from the sequencer 50 is written into channel feedback memory area 32 of result register 30.

FIG. 1 illustrates an example microcontroller circuit for automotive applications. In the preferred embodiment, the microcontroller controls airbag and chassis functions of the vehicle. Analog signals from several external sensors such as crash, tilt and acceleration sensors are connected to the various signal inputs P1 to P3 of the microcontroller. Sequencer 50 determines the order in which the individual signal inputs are polled. Sequencer 50 thus outputs at line 16 a digital message with the channel ID of the respective signal input polled. Control circuit 15 receives the digital message and generates an enable signal for the corresponding switching element S1 to S3 at the appropriate enable line E1 to E3 corresponding to the selected input line P1 to P3. The corresponding switch S1 to S3 responds to the enable signal and closes to pass the selected signal input P1 to P3 to output 11 of switch array 10. Sample and hold circuit 21 samples the analog signal from the selected signal input P1 to P3. A/D converter 22 converts the sampled analog signal value to an n-bit digital value. The n-bit digital value is then written via parallel lines 23 into result bits memory area 33 of result register 30.

Compare logic circuit 40 monitors the enable signals on enable lines E1 to E3 via feedback lines F1 to F3. Compare logic circuit 40 determines whether an enable signal is applied to the enable line of the appropriate switching element S1 to S3 corresponding to the channel ID specified by the channel select signal on line 16. If any mismatch occurs, compare logic circuit 40 raises a flag to initiate an exception handling routine. Alternatively, or in addition, an interrupt signal is generated or any similar action is performed to initiate an exception handling. In addition, compare logic circuit 40 writes the channel select signal from line 16 and the channel feedback from feedback lines F1 to F3 into channel feedback memory area 31 and channel identifier memory area 32 of result register 30. This allows further comparison by application software.

The channel feedback data written into memory area 31 of result register 30 is a sample bit pattern that indicates which of the enable lines E1 to E3 have a high signal state and which have a low signal state applied. For the three enable lines E1 to E3 in the exemplary embodiment, the channel feedback has a length of three bits. Each bit corresponds to one of the enable lines E1 to E3 and indicates whether the respective enable line is in a high ("1") or a low ("0") state. Result register 30 serves as an input register for an embedded processor of the microcontroller (not shown) which runs application program 60. The data content of result register 30 is thus accessible by application program 60. Since all information including the digitized data from A/D converter 22, the selected channel ID and the channel feedback are available, the application program can perform crosschecks to determine whether the appropriate channel ID was provided by control and status sequencer 50 and whether control logic 15 of the switch array 10 enabled the signal input corresponding to the channel select signal. Moreover, additional status bits can be passed to application program 60 through result register 30.

The channel feedback data need not necessarily be stored in memory area 31 of result register 30. This channel feedback data could be stored separately from the result bits or not stored at all if only the exception flag is used.

A hardware comparison as illustrated in this embodiment is preferred because it provides a fast and reliable detection of errors. Plain software comparison provides, however, greater flexibility and may be preferred in certain non-time critical applications.

Having described a preferred embodiment of the invention, it should be noted that the invention is not limited to the particulars presented there. Conversely, those skilled in the art will appreciate that various modifications and substitutions can be made without departing from the concepts of the invention. In particular, while in the example embodiment includes only three signal inputs, switching elements and feedback lines for external input channels for the sake of simplicity, it should be understood that in real applications any suitable number of external channels could be used. Moreover, depending on the actual application, more than one signal input may be required at a time, which corresponds to several sensor inputs. While the functions of the control and status sequencer, the control logic and the compare logic can in principle be implemented by hardware alone, it should be clear that these functions can also be implemented by programmable hardware and corresponding firmware.

What is claimed is:

1. An integrated programmable device comprising:
   a plurality of signal inputs (P1, P2, P3) and a plurality of switching elements (S1, S2, S3) each switching element is connected to a different one of said signal inputs (P1, P2, P3) for selecting under the control of a control circuit (15) at least one of said signal inputs (P1, P2, P3) for passing a selected input signal;
   said control circuit (15) receiving a channel select signal (16) indicative of a signal input to be selected and comprising a plurality of enable lines (E1, E2, E3) for selectively activating corresponding ones of said switching elements (S1, S2, S3) in accordance with said channel select signal (16); and
   a plurality of feedback lines (F1, F2, F3) each connected to a different one of said enable lines (E1, E2, E3) for providing a channel feedback indicative of which of said plurality of switching elements (S1, S2, S3) are enabled.

2. An integrated programmable device according to claim 1, further comprising:
   a compare logic circuit (40) receiving said channel select signal (16) and said feedback lines (F1, F2, F3), said compare logic circuit (40) determining whether one or more enable signals generated by said control circuit (15) correspond to said channel select signal (16) and initiating exception handling in case of a mismatch.

3. An integrated programmable device according to claim 1, wherein the integrated programmable device is controlled by a software program (60), the integrated programmable device further comprising:
   a memory (30) connected to said feedback lines (F1, F2, F3) for storing said channel feedback; and
   wherein the software program (60) may access said memory (30) for comparison with said channel select signal (16).

4. An integrated programmable device according to claim 1, wherein:
   said signal inputs (P1, P2, P3) are analog inputs; and
   wherein said integrated programmable device further comprises:
   a sample and hold circuit (21) having an input connected to an output of each of said switching elements (S1-S3) and an output; and
   an A/D converter (22) having an input connected to said output of said sample and hold circuit (21).

5. An integrated programmable device according to claim 4, wherein:
   said A/D converter (22) has an output connected to said memory (30) for storing therein a digital value derived from the selected signal input.

6. An integrated programmable device according to claim 1, wherein:
   said switching elements (S1, S2, S3) are arranged in a switch array (10).

7. An integrated programmable device according to claim 1, further comprising:
   a sequencer (50) for generating under the control of a software program (60) a sequence of channel select signals (16).

8. A method for controlling the operation of an integrated programmable device that has a plurality of signal inputs and a plurality of switch elements each of which is connected to a different one of said signal inputs, said method comprising the steps of:
   receiving a plurality of input signals (P1-P3) at the signal inputs;
   generating a channel select signal (16) specifying at least one of the input signals (P1, P2, P3) to be selected;
   generating an enable signal for at least one of said switching elements (S1, S2, S3) in accordance with said channel select signal (16) by a control circuit (15);
   deriving a channel feedback signal from said enable signal; and
   comparing said channel feedback signal (F1, F2, F3) with said channel select signal (16) and initiating an exception handling in case of a mismatch.

* * * * *

UNITED STATES PATENT AND TRADEMARK OFFICE
CERTIFICATE OF CORRECTION

PATENT NO. : 7,573,830 B2
APPLICATION NO. : 11/228882
DATED : August 11, 2009
INVENTOR(S) : Wagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Seventh Day of September, 2010

David J. Kappos
*Director of the United States Patent and Trademark Office*